UNITED STATES PATENT OFFICE.

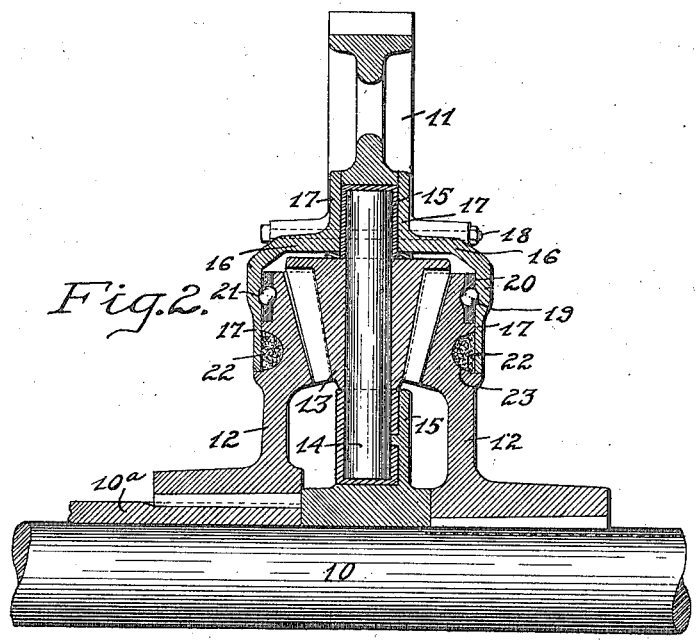
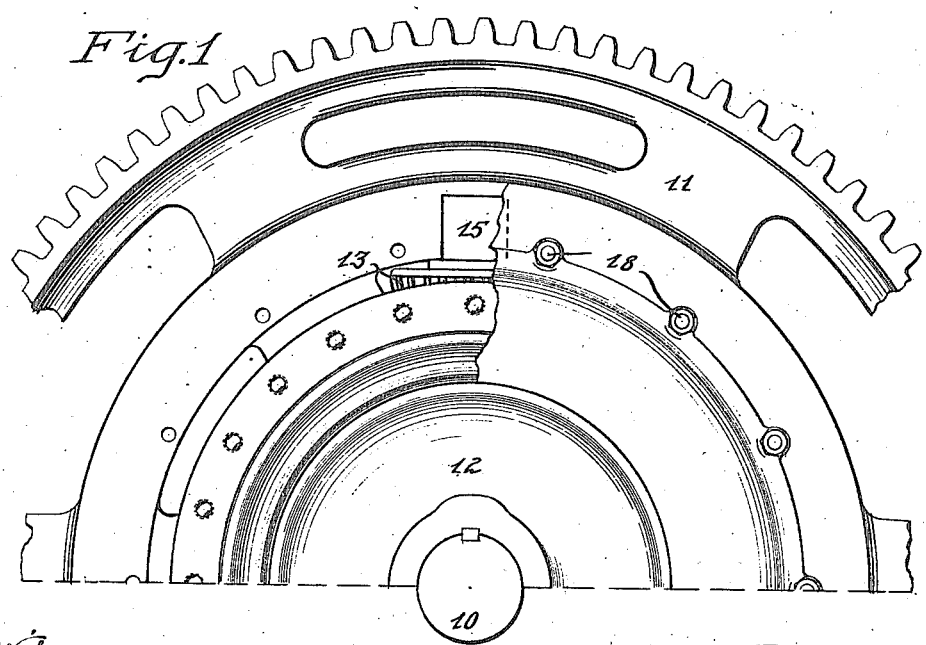

NORMAN E. BUNTING, OF CHICAGO, ILLINOIS, ASSIGNOR, BY MESNE ASSIGNMENTS, TO INTERNATIONAL HARVESTER COMPANY OF NEW JERSEY, A CORPORATION OF NEW JERSEY.

DIFFERENTIAL GEARING.

1,158,439.      Specification of Letters Patent.      Patented Nov. 2, 1915.

Application filed April 21, 1913. Serial No. 762,654.

*To all whom it may concern:*

Be it known that I, NORMAN E. BUNTING, a citizen of the United States, residing at Chicago, in the county of Cook and State of Illinois, have invented certain new and useful Improvements in Differential Gearing, of which the following is a full, clear, and exact specification.

My invention relates to differential gearing and has for its object to overcome the side thrust of opposed gears therein and their consequent spreading apart caused by the action of pinions operated between them.

Furthermore, it is my object to eliminate all lateral movement throughout the gearing, and more specifically to form in connection with a gearing of this class, an oil tight casing for the intermeshing gears capable of reinforcing the gear wheels against lateral movement.

I attain these objects by means of reinforcing members arranged on opposite sides of the gearing and secured thereon in such a manner as to tightly inclose the meshing gears.

The foregoing and other objects and advantages of my device will become readily apparent from the following detailed description of one form of my invention, which is illustrated in the accompanying drawings, wherein—

Figure 1 shows a side elevation of the upper half of the differential gear embodying my invention; and, Fig. 2 shows a vertical sectional view of the device shown in Fig. 1.

In the drawings I have shown a shaft or axle 10 on which is mounted differential gearing of conventional form. This gearing comprises essentially the driving gear 11, two coaxial bevel gears 12, and a plurality of revoluble bevel pinions 13 operating between said bevel gears. One of the gears 12 is keyed to the shaft 10 and the other to a sleeve 10ª. The bevel pinions 13 are carried on shafts 14 radially centered within the driving gear and mounted in bearings 15. All of the parts just described are, of course, of ordinary construction and in themselves form no part of this invention.

I employ two reinforcing members 16 arranged on opposite sides of the gearing, each of said members comprising a circumferential plate provided with offset flanges 17 extending in opposite directions. The outer flanges of these plates engage opposite sides of the driving gear at points adjacent to the outer bearings of the revoluble pinion shafts. In this position they are rigidly held by means of clamping bolts 18 extended through the body portion of the driving gear. An annular depression is provided in the rear outer surface of the gears 12 and the inner flanges of the reinforcing members enter these depressions presenting in this manner a surface flush with that of the gears. These inner flanges are arranged to frictionally engage the depressed portion of the bevel gears and when the outer flanges of the reinforcing members are rigidly secured in position on the driving gear, all spreading tendencies of the opposed bevel gears are effectually overcome. Provision is made for independent rotatable movement between the bevel gears and the reinforcing members by means of ball bearings 19 carried in circumferentially arranged races 20 sunk in the gears flush with the corners thereof. In order to obtain a close contact between the bevel gears and the inner flanges of the reinforcing members, I provide corresponding grooves 21 in the adjacent surfaces of these parts into which grooves the balls enter.

In the operation of differential gears, and especially those employed in traction engines, it is found in practice that the bevel pinions cause a spreading apart of the bevel gears with which they mesh and the resulting strain on the bevel gears in many instances is sufficient to cause a breakage of said gears. In any case, there is always present sufficient side thrust on the part of the bevel gears to cause a marked wearing on the corners of their hubs. Furthermore, when the bevel gears have been spread apart, lateral movement of the driving gear results, which likewise causes corner wear on the bearing surfaces of its hub. Obviously, the effect of thus wearing the hubs is to materially shorten the life and decrease the working efficiency of the entire differential gearing.

It will be seen that the reinforcing members arranged in the manner just described will operate to hold the bevel gears secure against spreading and also effectually overcome any tendency toward lateral movement on the part of the driving member, so that in the use of these reinforcing members a uniform wearing of the hubs of all gears results and danger of breakage on the part of the opposed gears is materially lessened.

It will be seen that I have arranged the reinforcing members in such a manner as to form a casing entirely surrounding the meshing gears, and where it is desired to operate the gears in an oil bath, I employ packing rings 22 fitted into annular grooves 23 formed in the bevel gears. The inner ends of the reinforcing members will thus engage the packing rings and hold them firmly in place within the grooves and in this manner an oil tight connection is secured between the parts. Furthermore, such a casing will serve to keep out all foreign matter, such as dust and dirt, and in this way add to the life of the gears.

It is to be understood that I do not limit myself to the specific form of my invention shown and described, for it is obvious that changes in the arrangement and construction of the different parts of my device may be made without departing from the spirit of my invention as disclosed in the appended claims.

I claim—

1. In a gearing device, the combination of a driving member, two driven members, revoluble pinions operating between said driven members, radial shafts for said pinions, bearings for said shafts, reinforcing members arranged on opposite sides of said gearing, each of said members having one end in frictional engagement with the side of the adjacent driven gear and the other end engaging the adjacent side of the driving gear and the outer bearings of said revoluble pinion shafts, and means for securing together the ends of said reinforcing members engaging the revoluble pinion shaft bearings.

2. The combination of a driving gear, two driven gears operatively connected, reinforcing members arranged on opposite sides of said gears, each of said members comprising a circumferential plate in position with its outer end rigidly secured to the adjacent side of said driving gear and having its inner end in frictional engagement with the side of the adjacent driven gear, anti-friction devices between each of said driven gears and the engaging portion of the reinforcing member to permit independent rotatable movement therewith, and a packing ring arranged between said driven gears and the engaging portion of the reinforcing members to form an oil-tight connection between said parts.

3. In a device of the class described, the combination of a shaft, two beveled gears spaced apart and mounted on said shaft, revoluble beveled pinions carried between said beveled gears, radial shafts for said pinions, bearings for said radial shafts, means for operating said revoluble pinions, reinforcing members arranged on opposite sides of said beveled gears each of said members comprising a circumferential plate having one end in engagement with the side of the adjacent beveled gear and the other end engaging the outer bearings of said revoluble pinion shafts, the outer ends of said reinforcing members being rigidly secured together against said bearings, and the inner ends of said reinforcing members being in frictional engagement with the beveled gears and capable of independent rotatable movement therewith.

Chicago, Ill., Apr. 8, 1913.

In testimony whereof I affix my signature, in the presence of two witnesses.

NORMAN E. BUNTING.

Witnesses:
J. W. LUNDGUIST,
C. H. BURNS.